United States Patent [19]

Fujihira et al.

[11] Patent Number: 5,382,332
[45] Date of Patent: Jan. 17, 1995

[54] METHOD FOR ELECTROLYTIC REDUCTION OF CARBON DIOXIDE GAS USING AN ALKYL-SUBSTITUTED NI-CYCLAM CATALYST

[75] Inventors: Masamichi Fujihira, Minami-kosugayajutaku 3-404, No. 2000-10, Kosugaya-cho, Sakae-ku, Yokohama City, Kanagawa Pref.; Yoshiki Hirata, Hoya; Kosaku Suga, Mitaka; Uichi Akiba, Yamato, all of Japan

[73] Assignees: Nissan Motor Co., Ltd.; Masamichi Fujihira, both of Yokohama, Japan

[21] Appl. No.: 110,017

[22] Filed: Aug. 23, 1993

Related U.S. Application Data

[62] Division of Ser. No. 690,832, Apr. 24, 1991, Pat. No. 5,284,563.

[30] Foreign Application Priority Data

May 2, 1990 [JP] Japan .................................. 2-115283

[51] Int. Cl.$^6$ .............................................. C25B 1/00
[52] U.S. Cl. ................................. 204/128; 204/59 R; 204/129
[58] Field of Search ..................... 204/59 R, 101, 128, 204/129

[56] References Cited

PUBLICATIONS

Marc Beley et al., "Electrocatalytic Reduction of $CO_2$ by Ni Cyclam$^{2+}$ in Water: Study of the Factors Affecting the Efficiency and the Selectivity of the Process," J. Am. Chem. Soc. 1986, 108, pp. 7461–7467.

Iwao Tabushi et al., "Preparation of C-Alkylated Macrocyclic Polyamines," Tetrahedron Letters No. 12, 1977, pp. 1049–1052.

Mario Ciampolini et al., "Steric Effects on the Solution Chemistry of Nickel(II) Complexes with N–Monomethylated 14–Membered Tetraaza Macrocyles. The Blue-to-Yellow Conversion and the Oxidation and Reduction Behavior," Inorg. Chem., 1986, 25, pp. 4131–4135.

Mario Ciampolini et al., "Dinickel and Dicopper Complexes with N,N–Linked Bis(cyclam) Ligands. An Ideal System for the Investigation of Electrostatic Effects on the Redox Behavior of Pairs of Metal Ions," Inorg. Chem., 1987, 26, pp. 3527–3533.

Wagner et al., "Preparation of Macrocyclic Tertiary Amine Complexes of Nicek (11) by Alkylation of Coordiated Amine, Crystal Structure of a Monoazide Bridged Dimer of Ni(N–tetramethylcyclam)$^{2+}$, " J. Am. Chem. Soc. (USA), vol. 96, No. 8, Apr. 1974, pp. 2625–2627.

Masamichi Fujihira et al., "Electrocatalytic reduction of $CO_2$ by nickel(II) cyclam. Study of the reduction mechanism on mercury by cyclic voltammetry, polarography and electrocapillarity," J. Electroanal. Chem., 292, 1990, pp. 199–215.

*Primary Examiner*—Kathryn Gorgos
*Attorney, Agent, or Firm*—Foley & Lardner

[57] ABSTRACT

An electrocatalyst for use in electrolytic reduction of carbon dioxide gas in an aqueous solution. The electrocatalyst is formed of nickel alkyl cyclam which is expressed by the general formula:

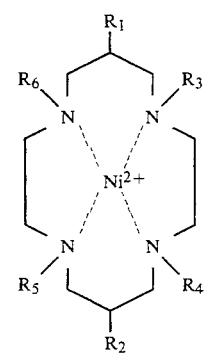

where each of $R_1$, $R_2$, $R_3$, $R_4$, $R_5$ and $R_6$ is selected from the group consisting of hydrogen atom and aliphatic saturated hydrocarbon group expressed by the formula of $C_nH_{2n+1}$; wherein at least one of $R_1$, $R_2$, $R_3$, $R_4$, $R_5$ and $R_6$ is the aliphatic saturated hydrocarbon group in which n is a number ranging from 1 to 22. The nickel alkyl cyclam as the electrocatalyst is excellent in stability and energy consumption improving effect while exhibiting a high carbon dioxide gas reduction effect, as compared with conventional nickel cyclam.

20 Claims, 4 Drawing Sheets

METHOD FOR ELECTROLYTIC REDUCTION OF CARBON DIOXIDE GAS USING AN ALKYL-SUBSTITUTED NI-CYCLAM CATALYST

This application is a divisional of application Ser. No. 07/690,832, filed Apr. 24, 1991 now U.S. Pat. No. 5,284,563.

BACKGROUND OF THE INVENTION

1. Field of the Invention

This invention relates to improvements in an electrocatalyst for electrolytic reduction of carbon dioxide gas ($CO_2$).

2. Description of the Prior Art

Attention is being paid to researches and developments relating to reduction fixation and recovery of carbon dioxide gas, which are disclosed for example in Japanese Patent Provisional Publication No. 65-15388. These researches and developments include ones relating to electrochemical reduction of carbon dioxide gas in which a reduction by using an electrolysis catalyst is used for the purpose of improving selectivity in reaction and decreasing over voltage. The reduction catalyst is used in the state to modify the surface of an electrode of metal, or to be added in an electrolyte solution. It is known that examples of such a reduction catalyst are metallopthanine complexes and nickel microcyclic polyamine.

Additionally, it is disclosed that nickel cyclam (1,4,8,11-tetraazatetradecane) serves as an electrocatalyst for reducing carbon dioxide to carbon monoxide with a high reaction selectivity even in an aqueous solution, in "Journal of the American Chemical Society", 1986, 108, 7461–7467.

However, the following difficulties have been encountered in the conventional electrocatalyst of nickel cyclam: (a) An effect of decreasing the overvoltage is low, thereby increasing energy consumption. (b) The turnover number for the catalyst is low. (3) The stability of the catalyst is low. (4) In the aqueous electrolyte solution, a hydrogen gas generation reaction and a carbon dioxide reduction reaction compete with each other, so that the selectivity of reactions is insufficient. Thus, the conventional electrocatalyst of nickel cyclam is insufficient for practical use in electrolytic reduction of carbon dioxide gas in an aqueous solution.

SUMMARY OF THE INVENTION

An object of the present invention is to provide an improved electrocatalyst for electrolytic reduction of carbon dioxide gas in aqueous solution, by which difficulties encountered in conventional similar electrocatalysts can be effectively overcome.

Another object of the present invention is to provide an improved electrocatalyst for electrolytic reduction of carbon dioxide gas in an aqueous solution, which is high in reaction selectivity and stability while the turnover number therefor is high.

Hitherto it is known that in the case where alkyl groups are introduced into a nickel cyclam, the reactivity of the nickel cyclam with other groups is decreased because of steric hindrance of the introduced alkyl groups regardless of C-substitution or N-substitution for the introduced alkyl groups. By analogy on the basis of the above, it will be expected that it is better not to carry out the substitution with the alkyl groups. However, it is to be noted that it has been confirmed that some nickel alkyl cyclams exhibit a carbon dioxide gas reduction ability equal to or higher than nickel cyclam. Thus, upon selecting the number of alkyl groups, introduction of alkyl groups acts advantageously from the catalytic veiw point over the above disadvantage of the steric hindrance. Furthermore, attention should be paid to the fact that the difficulties in the conventional nickel cyclam as the electrocatalyst can be solved by introducing alkyl groups into the nickel cyclam. The above was confirmed by the present inventors, which has led the inventors to realization of the present invention.

Thus, the electrocatalyst of the present invention is for electrolytic reduction of carbon dioxide gas in an aqueous solution and is expressed by the general formula:

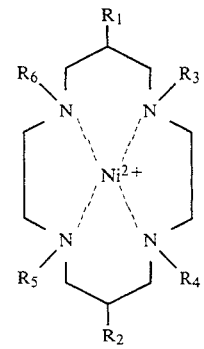

where each of $R_1$, $R_2$, $R_3$, $R_4$, $R_5$ and $R_6$ is selected from the group consisting of hydrogen atom and aliphatic saturated hydrocarbon group expressed by the formula of $C_nH_{2n+1}$; and at least one of $R_1$, $R_2$, $R_3$, $R_4$, $R_5$ and $R_6$ is the aliphatic saturated hydrocarbon group in which n is a number ranging from 1 to 22.

Introduction of alkyl groups in the structure of the cyclam provides the electrocatalyst for $CO_2$ reduction which is high in stability and reaction selectivity and less in energy consumption in electrolysis, while exhibiting a high reduction effect to carbon dioxide gas. Thus, this electrocatalyst is industrially highly valuable.

DETAILED DESCRIPTION OF THE INVENTION

Figure 1:
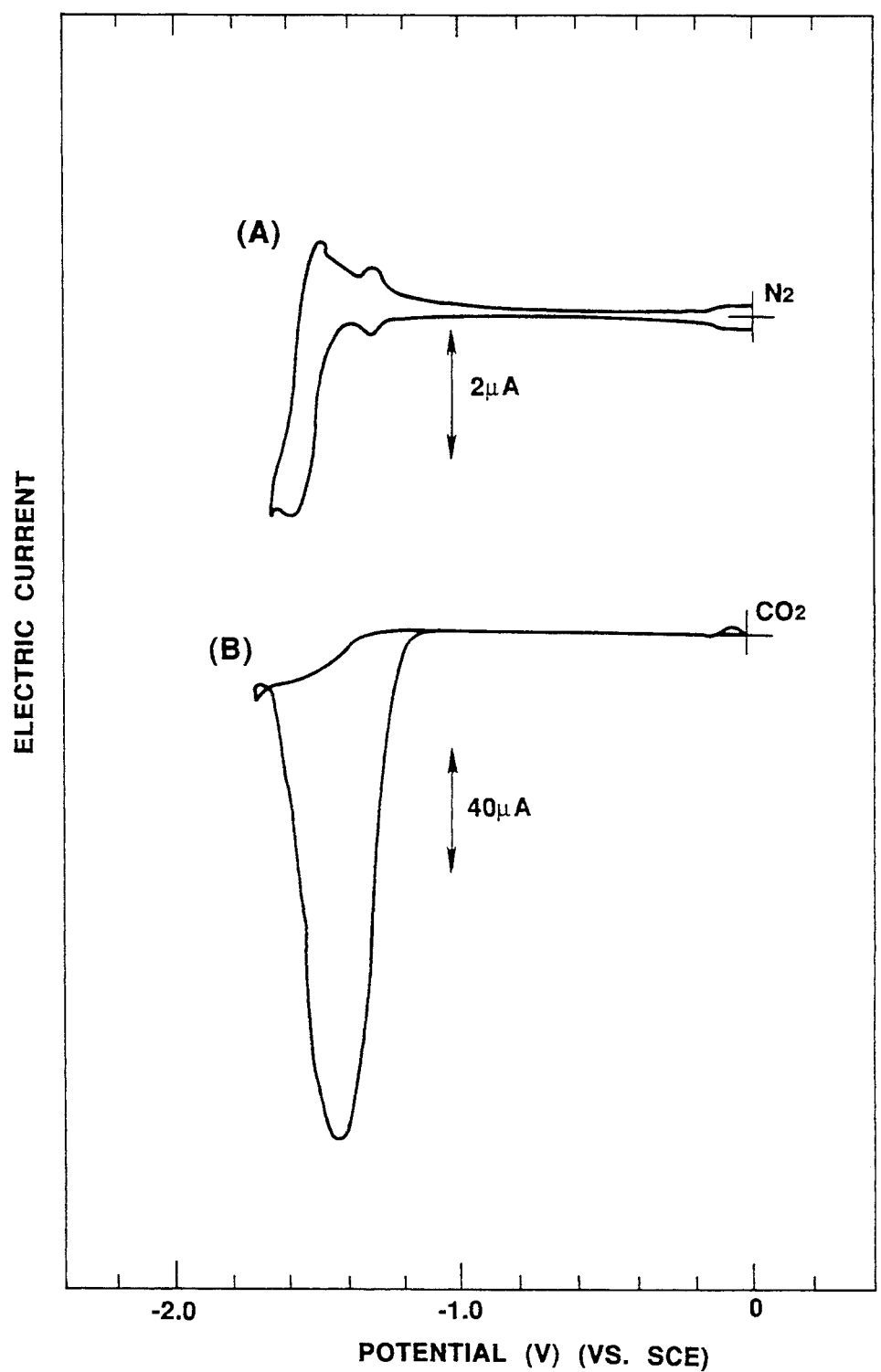
FIG. 1 is a graph showing cyclic voltammograms of a nickel alkyl cyclam of Example 1 under $N_2$ and $CO_2$ according to the present invention.

According to the present invention, an electrocatalyst for electrolyte reduction of carbon dioxide gas is expressed by the general formula:

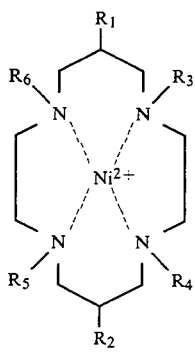

where each of $R_1$, $R_2$, $R_3$, $R_4$, $R_5$ and $R_6$ is selected from the group consisting of hydrogen atom and aliphatic saturated hydrocarbon group expressed by the formula of $C_nH_{2n+1}$; and at least one of $R_1$, $R_2$, $R_3$, $R_4$, $R_5$ and $R_6$ is the aliphatic saturated hydrocarbon group in which n is a number ranging from 1 to 22.

The electrocatalyst of the present invention is formed of nickel alkyl cyclam which is a derivative of nickel cyclam. Such nickel alkyl cyclam can be produced by a method as disclosed in a technical literature "Tetrahedron Letters", No. 12, pp. 1049-1052, 1977, in which each of $R_1$ and $R_2$ in the formala (1) is aliphatic hydrocarbon group. In this production method, the nickel alkyl cyclam is obtained by reducing 3-alkyl-2,4-dioxo-1,5,8,12-tetraazacyclotetradecane with diborane. The 3-alkyl-2,4-dioxo-1,5,8,12-tetraazacyclotetrodecane is obtained by a condensation reaction between alkylmalonic diester and 1,4,8,11-tetraazaundecane. Additionally, a nickel alkyl cyclam having aliphatic hydrocarbon at the positions of $R_3$, $R_4$, $R_5$ and $R_6$ in the formula (1) can be produced by a method disclosed in technical literatures "Inorg. Chem.", 1986, 25, 4131-4135 and 1987, 26, 3527-3533. Otherwise, the nickel alkyl cyclam can be produced by alkylation of nickel cyclam with alkyl halide.

In technical literature "J. AM. Soc.", 1986, 108, 7461-7467, it is suggested that the nickel cyclam adsorbed on the surface of an electrode plays an important role in electrolytic reduction of carbon dioxide. This technical literature discloses a measurement of oxidation-reduction wave of Ni(II)/Ni(I) by cyclic voltammetry using a mercury electrode under saturated nitrogen, in which an oxidation-reduction wave (diffusion controlled wave) due to diffusion of the nickel cyclam from a solution is mainly observed, while another oxidation-reduction wave (adsorption wave) due to adsorption of Ni(II)ad/Ni(I)ad redox couple the surface of the electrode appears as a prewave which has been slightly shifted toward anodic potential or to a more positive potential relative to the above-mentioned diffusion controlled wave. The diffusion control wave appears at $E_{\frac{1}{2}}$ (half-wave potential) = 1.56 V versus a saturated calomel electrode, while the adsorption wave appears at $E_{\frac{1}{2}} = 1.35$ V. In the above, Ni(II)/Ni(I) represents a redox couple of Ni having a valence of +2 and Ni having a valence of +1 in the nickel cyclam. Additionally, the Ni(II)ad/Ni(I)ad represents the above-mentioned redox couple of the nickel cyclam adsorbed on the surface of the electrode.

Under the fact that an adsorbed species on the surface of the electrode plays an important role in electrolytic reduction of carbon dioxide gas, it is preferable that (a) the adsorption wave is clearly separate from the diffusion controlled wave, and (b) both the waves are shifted toward anodic potentials.

Electrocatalyst of the present invention meets the above conditions (a) and (b). In other words, the adsorption wave of the nickel alkyl cyclam of the present invention is observed more clearly than that of the conventional nickel cyclam in a cyclic voltammogram obtained by a cyclic voltammetry. This demonstrates that the nickel alkyl cyclam is stably adsorbed onto the surface of the electrode, which is effective for the electrolytic reduction of carbon dioxide gas.

It has been apparent that in the nickel alkyl cyclam having (substituted) alkyl groups respectively at the positions of $R_3$, $R_4$, $R_5$ and $R_6$, the potentials of both the adsorption wave and diffusion controlled wave are largely shifted toward anodic potential as the number of the substituent groups increases. This eliminates overvoltage of the reduction reaction of carbon dioxide gas, thereby reducing energy consumption. Additionally, such decreases in applied voltage in an aqueous solution suppresses generation of hydrogen gas competing with carbon dioxide gas reduction, thus providing a high selectivity of the carbon dioxide reduction. Accordingly, within a range reaching the thermodynamically determined reduction potential of carbon dioxide, the anodic shifts of the potential of the adsorption wave and the diffusion controlled wave are effective for lowering energy consumption and for high selectivity of carbon dioxide reduction reaction. As will be appreciated from the above, the nickel alkyl cyclam of the present invention is more excellent as an electode catalyst for electrolytic reduction of carbon dioxide, than the conventional nickel cyclam.

In the nickel alkyl cyclam of the present invention, the solubility thereof to water changes according to the magnitude of n in the aliphatic saturated hydrocarbon ($C_nH_{2n+1}$). More specifically, it is judged that when n is within a range from 1 to about 6, the nickel alkyl cyclam is soluble in water; when n is not less than 14, it is insoluble in water; and when n is between about 6 and 14, it becomes a surface active agent. Of these nickel alkyl cyclams, one soluble in water is used as the electrocatalyst upon being formed into an aqueous electrolyte solution. Otherwise, one insoluble in water can be also used as the electorocatalyst upon being adsorbed onto the surface of the electrode by a Langmuir Blodgett technique. The electrode on which the electrocatalyst is adsorbed is preferably formed of a material high in hydrogen overvoltage, such as mercury, gold amalgam, lead, tin or cadmium.

In order to evaluate the electrocatalyst for electrolytic reduction of carbon dioxde gas, according to the present invention, Examples and Experiment will be discussed herenafter.

EXAMPLE 1

Cyclic voltammetry was conducted for a sodium hydrogen carbonate buffer solution (pH=6.2) containing 1 mM of nickel alkyl cyclam ($R_1 = C_2H_5$; and $R_2$, $R_3$, $R_4$, $R_5$ and $R_6 = H$), 0.1M of sodium perchlorate ($NaClO_4$) as an electrolyte, under $N_2$ thereby to obtain a cyclic voltammogram (A) in FIG. 1, and under $CO_2$ saturation thereby to obtain another cyclic voltammogram (B) in FIG. 1. In the above cyclic voltammetric measurements, a gold amalgam electrode was used as a working electrode; a saturated calomel electrode (SCE)

as a reference electrode; and a glassy carbon electrode as a counter electrode.

As shown in the cyclic voltammogram (A) in FIG. 1, the adsorption wave due to oxidation-reduction of Ni(II)ad/Ni(I)ad of the nickel alkyl cyclam was clearly appeared at $-1.36$ V, which demonstrated that the nickel alkyl cyclam was firmly adsorbed on the surface of the electrode. Additionally, as shown in the cyclic voltammogram (B) in FIG. 1, the reduction current sharply increased from $-1.14$ V, which demonstrated that the nickel alkyl cyclam of this Example exhibited an excellent reduction ability to carbon dioxide gas.

EXAMPLE 2

Figure 2:
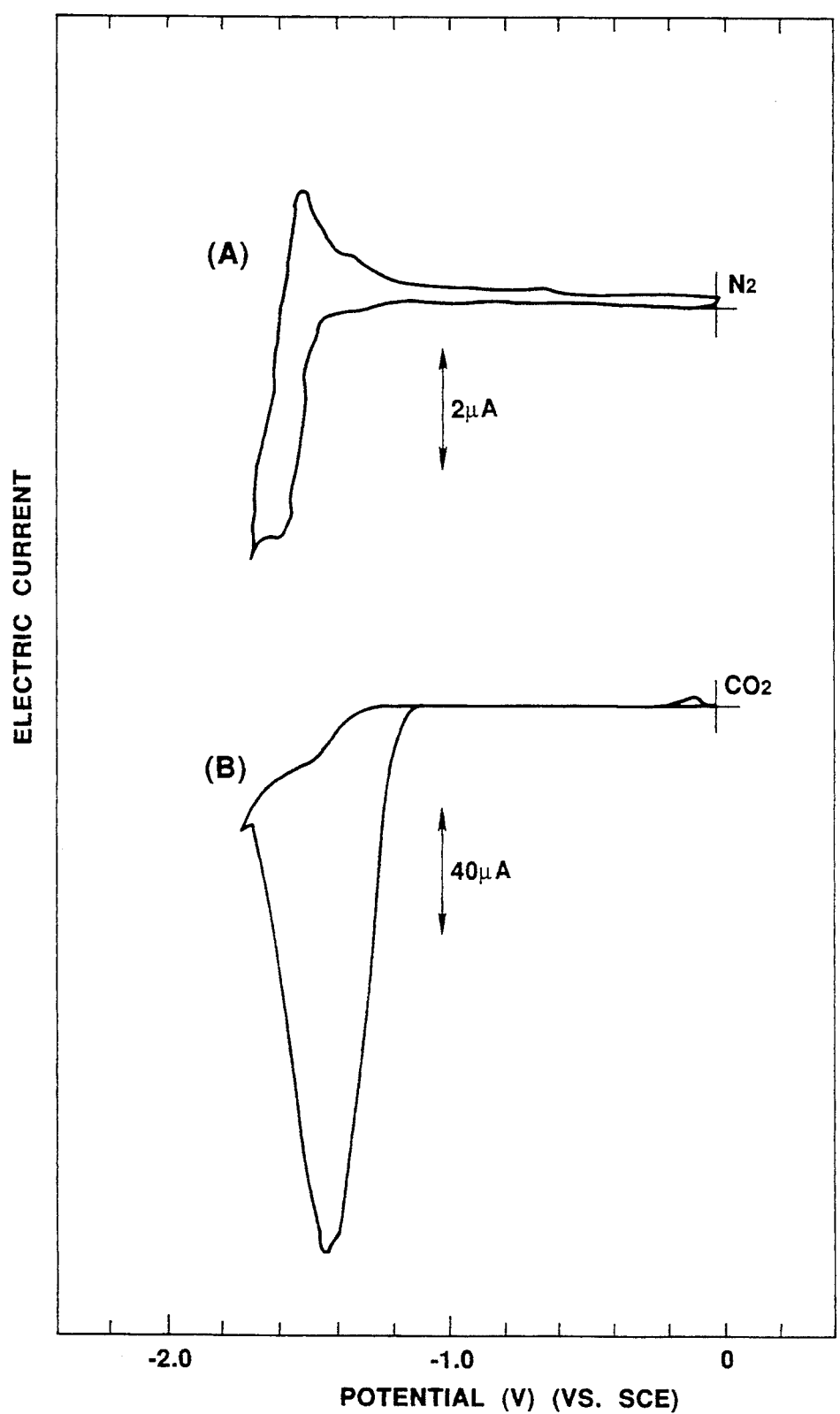
FIG. 2 is a graph similar to FIG. 1 but showing cyclic voltammograms of another nickel alkyl cyclam of Example 2 according to the present invention.

Cyclic voltammetry was conducted in the same way as those in Example 1 with the exception that used nickel alkyl cyclam (1 mM concentration) was of the type wherein $R_1=CH_3$; and $R_2$, $R_3$, $R_4$, $R_5$ and $R_6=H$, under $N_2$ saturation thereby to obtain a cyclic voltammogram (A) in FIG. 2, and under $CO_2$ saturation thereby to obtain another cyclic voltammogram (B) in FIG. 2.

As shown in the cyclic voltammogram (A) in FIG. 2, the adsorption wave due to oxidation-reduction of Ni(II)ad/Ni(I)ad of the nickel alkyl cyclam clearly appeared at 1.36 V, which demonstrated that the nickel alkyl cyclam was firmly adsorbed on the surface of the electrode. Additionally, as shown in the cyclic voltammogram (B) in FIG. 2, the reduction current sharply increased from $-1.08$ V, which demonstrated that the nickel alkyl cyclam of this Example exhibited an excellent reduction ability to carbon dioxide gas.

EXAMPLE 3

Figure 3:
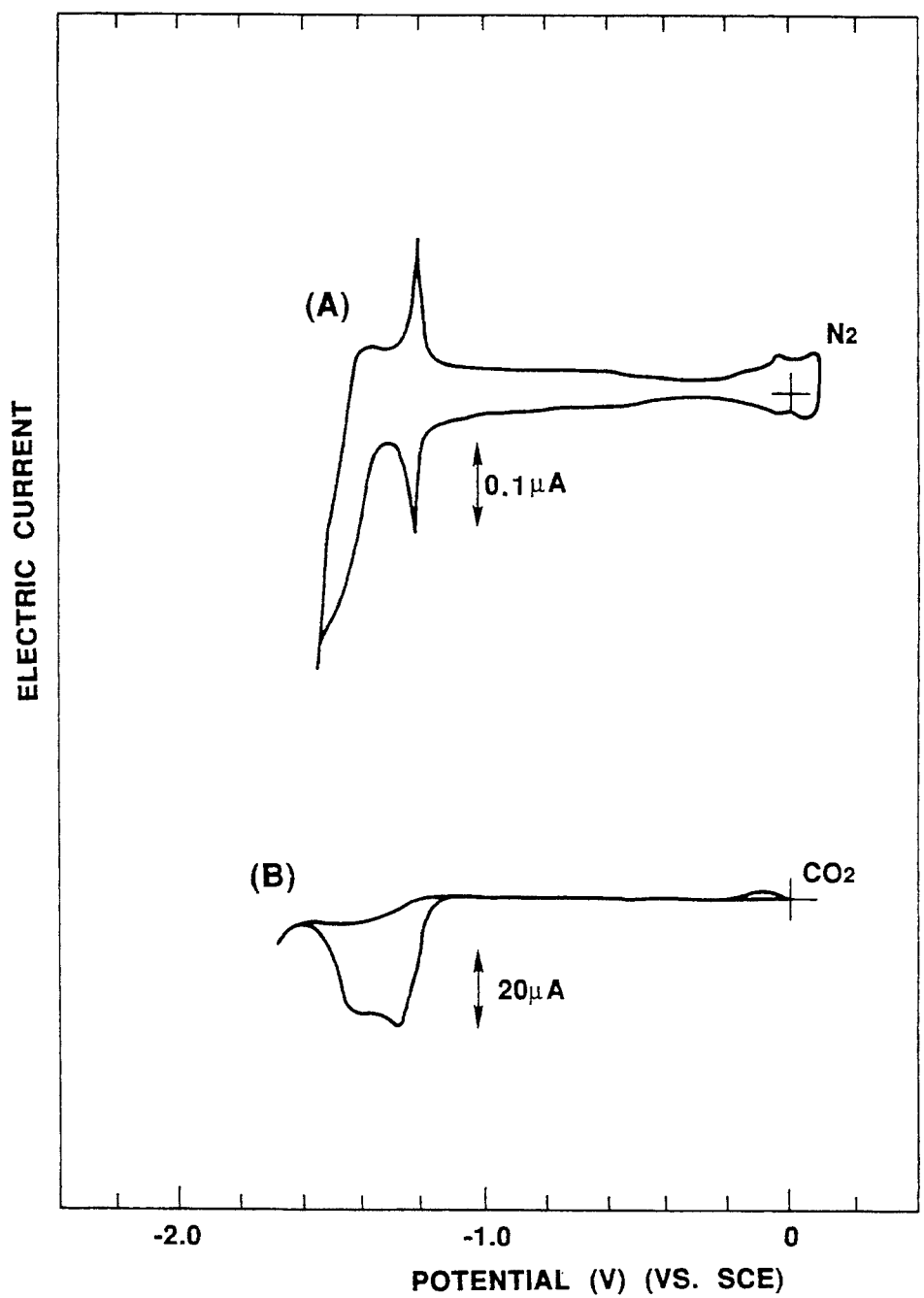
FIG. 3 is a graph similar to FIG. 1 but showing cyclic voltammograms of a further nickel alkyl cyclam of Example 3 according to the present invention.

Cyclic voltammetry was conducted in the same way as those in Example 1 with the exception that used nickel alkyl cyclam was of the type wherein $R_3=CH_3$; and $R_1$, $R_2$, $R_4$, $R_5$ and $R_6=H$, and the concentration of the nickel alkyl cyclam was 0.1 mM, under $N_2$ saturation thereby to obtain a cyclic voltammogram (A) in FIG. 3 and under $CO_2$ saturation thereby to obtain another cyclic voltammogram (B) in FIG. 3.

As shown in the cyclic voltammogram (A) in FIG. 3, the adsorption wave due to oxidation-reduction of Ni(II)ad/Ni(I)ad of the nickel alkyl cyclam clearly appeared, which demonstrated that the nickel alkyl cyclam was firmly adsorbed on the surface of the eletrode. Additionally, the diffusion controlled wave and the adsorption wave were anode-shifted respectively 100 mV and 90 mV as appreciated upon comparison with a cyclic voltammogram of the conventional nickel cyclam in FIG. 4. Furthermore, as shown in the cyclic voltammogram (B) in FIG. 3, the electrolytic reduction of carbon dioxide was stably carried out at the peak potential ($E=-1.22$ V) of the adsorption wave.

EXPERIMENT

A controlled potential electrolysis ($E=-1.29$ V) of an electrolyte solution containing each nickel alkyl cyclam (used in Examles 1, 2 and 3) or nickel cyclam was carried out for three hours to make an electrolytic reduction of carbon dioxide, under the following conditions:

Concentration of nickel alkyl cyclam or nickel cyclam: 1 mM;

Electrolyte solution: a solution containing $NaClO_4$ (0.1M) and $NaHCO_3$ (35 mM) having a pH of 6.2;

Electrode: a gold amalgam electrode (electrode surface=0.018 cm$^2$); and

Atmosphere: $CO_2$.

In the above experiment, so-called turnover number was determined for each of the nickel alkyl cyclam and the nickel cyclam when carbon dioxide was electrolytically reduced. The turnover number was a value obtained by dividing the quantity of electricity passed through the electrode by the concentration of the the nickel alkyl cyclam or the nickel cyclam. The turnover numbers of the respective cyclams were compared with each other as relative values as shown in Table 1. The experimental results of Table 1 demonstrate that the nickel alkyl cyclams of the present invention serve as excellent electrode catalysts for electrolytic reduction of carbon dioxide gas.

TABLE 1

| Sample | Turnover number (relative value) |
| --- | --- |
| Nickel cyclam | 1 |
| Nickel alkyl cyclam in Example 1 | 2.2 |
| Nickel alkyl cyclam in Example 2 | 2.0 |
| Nickel alkyl cyclam in Example 3 | 1.3 |

Figure 5:
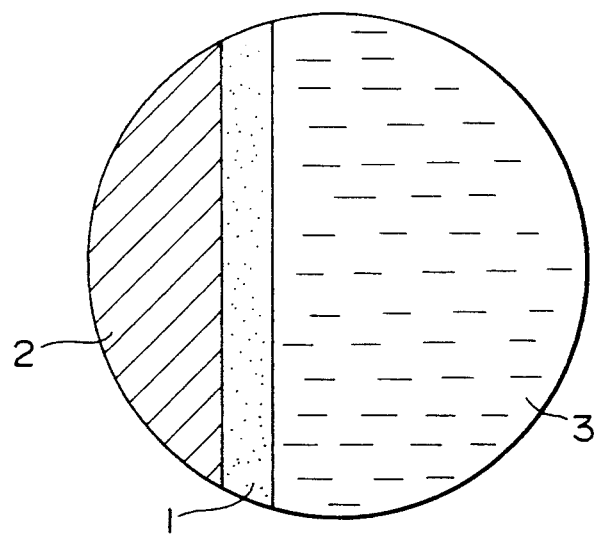
FIG. 5 is an enlarged sectional view showing a state in which the nickel alkyl cyclam of the present invention is adsorbed on the surface of an electrode in an electrolyte solution during an elecrolytic reduciton of carbon dioxide gas.

In this experiment, the nickel alkyl cyclam 1 was adsorbed on the surface of the electrode 2 and in contact with the electrolyte solution 3 as shown in FIG. 5 in which the electrode 2 with the nickel alkyl cyclam 1 is illustrated in an enlarged cross-section.

As discussed above, the redox potential of Ni(II)/Ni(I) of the nickel alkyl cyclam is shifted toward anode potential as compared with that of the conventional nickel cyclam. Such an anodic shift phenomena lowers the applied voltage during the electrolytic reduction of $CO_2$ thereby reducing the overvoltage. The reduction of overvoltage is the most important in performance of electrocatalyst.

The anodic shift phenomena can increase stability of nickel cyclam. The reason for this is as follows: As the applied voltage increases, the electrolysis current increases whereas nickel tends to be easily get out of the cyclam. It is to be noted that the nickel separated from the cyclam does not have an ability of reducing $CO_2$. Accordingly, the nickel alkyl cyclam can be used as a stable electrocatalyst when the redox potential is shifted anodically.

Figure 4:
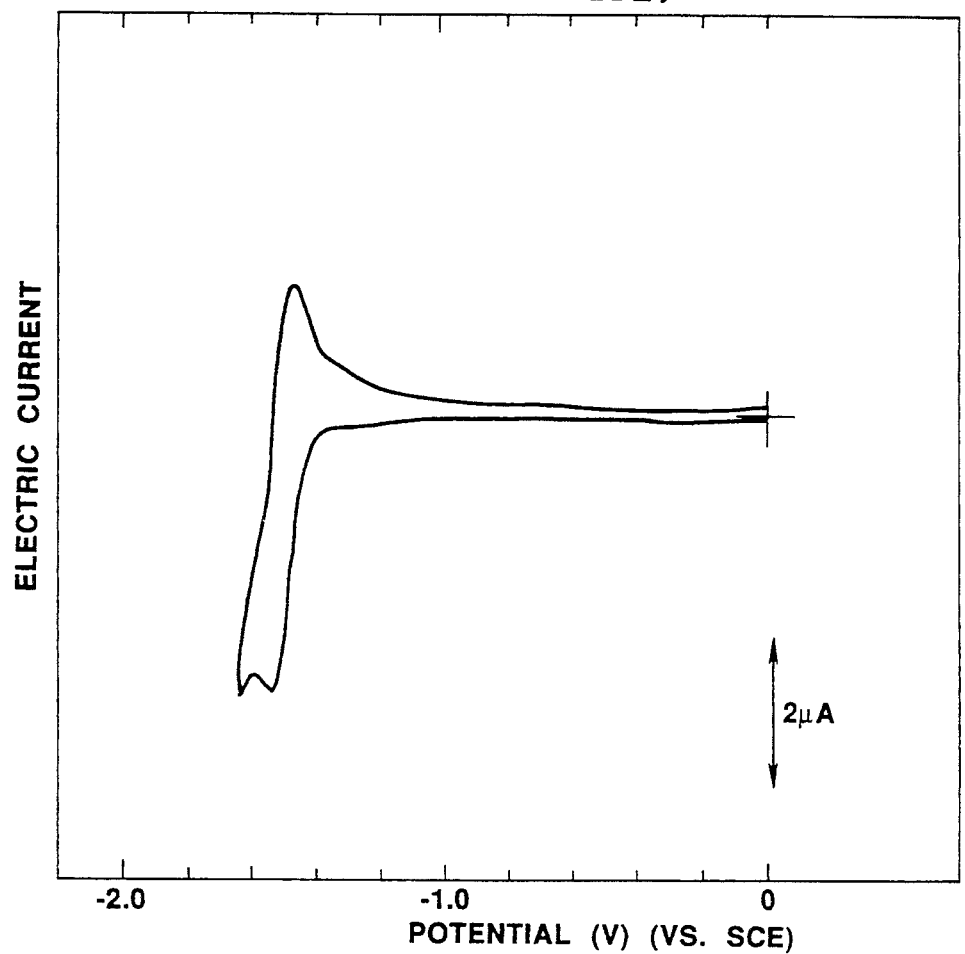
FIG. 4 is a graph showing a cyclic voltmmmogram of conventional nickel cyclam.

Additionally, as discussed above, the nickel alkyl cyclam adsorbed on the surface of the electrode plays an important role in the electrolytic reduction of $CO_2$. This adsorbed nickel alkyl cyclam is observed as the adsorption wave in a current-voltage curve. It is to be noted that this adsorption wave is observed very clearly as compared with that of the conventional nickel cyclam, particularly as shown in the voltammogram (A) in FIG. 3 in which the adsorption wave of the nickel alkyl cyclam was observed as a wave having a sharp peak. This demonstrated a strong and stable adsorption of the nickel alkyl cyclam onto the surface of the electrode, which seems to provide an excellent $CO_2$ reduction ability. In contrast, the corresponding adsorption wave of the nickel cyclam could not be observed so clealy as shown in FIG. 4. Thus, the adsorption condition of nickel cyclam onto the electrode is further improved by introducing alkyl groups thereinto.

Such introduction of alkyl groups can make nickel cyclam an amphipathic compound. As a result, the nickel alkyl cyclam is not only used as the electrocatalyst upon being added into a solution, but also used as a variety of molecular aggregates such as a monomolecular film, a bimolecular film, a micell, a vesicle and a liquid crystal. Additionally, the nickel alkyl cyclam may be used as a variety of functional organic materials. Hence, it will be appreciated that the nickel alkyl cyclam is highly effective and excellent in electrolytic reduction of carbon dioxide over the conventional nickel cyclam.

What is claimed is:

1. A method for the electrolytic reduction of carbon dioxide gas comprising:

absorbing onto an electrode an electrocatalyst expressed by the general formula:

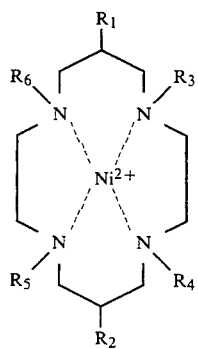

where each of $R_1$, $R_2$, $R_3$, $R_4$, $R_5$ and $R_6$ is selected from the group consisting of a hydrogen atom and an aliphatic saturated hydrocarbon group expressed by the formula of $C_nH_{2n+1}$; and at least one of $R_1$, $R_2$, $R_3$, $R_4$, $R_5$ and $R_6$ is the aliphatic saturated hydrocarbon group in which n is a number ranging from 1 to 22; and bringing carbon dioxide into association with the absorbed catalyst to effect said reduction.

2. A method as claimed in claim 1, where only one of $R_1$, $R_2$, $R_3$, $R_4$, $R_5$ and $R_6$ is the aliphatic saturated hydrocarbon group, the others are respectively hydrogens.

3. A method as claimed in claim 1, wherein said electrode is made of a material selected from the group consisting of gold amalgam, lead, tin, and cadmium.

4. A method as claimed in claim 1, wherein the reduction takes place in an aqueous solution.

5. A method as claimed in claim 1, wherein the electrocatalyst which is absorbed onto the electrode is absorbed from an electrolyte solution which contains the electrocatalyst.

6. A method for the electrolytic reduction of carbon dioxide gas comprising:

bringing carbon dioxide into association with an electrocatalyst expressed by the general formula:

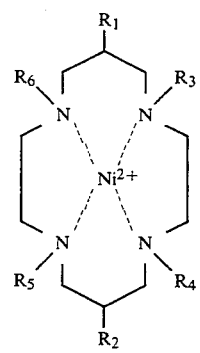

where each of $R_1$, $R_2$, $R_3$, $R_4$, $R_5$ and $R_6$ is selected from the group consisting of a hydrogen atom and an aliphatic saturated hydrocarbon group expressed by the formula of $C_nH_{2n\pm 1}$; and at least one of $R_1$, $R_2$, $R_3$, $R_4$, $R_5$ and $R_6$ is the aliphatic saturated hydrocarbon group in which n is a number ranging from 1 to 22, to effect said reduction.

7. A method as claimed in claim 6, wherein said electrocatalyst is on the surface of an electrode.

8. A method as claimed in claim 7, wherein the electrode is in an aqueous solution.

9. A method as claimed in claim 8, wherein said aqueous solution is an aqueous electrolyte solution.

10. A method as claimed in claim 9, wherein the electrolyte solution contains sodium perchlorate as an electrolyte.

11. A method as claimed in claim 7, wherein the electrode is formed of a material selected from the group consisting of mercury, gold, amalgam, lead, tin, and cadmium.

12. A method as claimed in claim 6, wherein the reduction takes place in an aqueous solution.

13. A method as claimed in claim 6, wherein $R_3$, $R_4$, $R_5$, and $R_6$ are each alkyl groups, which may be the same or different.

14. A method as claimed in claim 6, wherein $R_1$ and $R_2$ are each alkyl groups, which may be the same or different.

15. A method as claimed in claim 6, wherein $R_1$ is an alkyl group and $R_2$-$R_6$ are hydrogen atoms.

16. A method as claimed in claim 6, wherein only one of $R_1$-$R_6$ is an alkyl group and the other five R groups are hydrogen.

17. A method as claimed in claim 6, wherein at least one of the R groups is an alkyl group which has from 1 to 6 carbon atoms.

18. A method as claimed in claim 6, wherein at least one of the R groups is an alkyl group which has at least six carbon atoms.

19. A method as claimed in claim 6, wherein the reduction takes place in a nitrogen atmosphere.

20. A method of using as an electrocatalyst for the electrolytic reduction of carbon dioxide gas in an aqueous solution, a compound expressed by the general formula:

where each of $R_1$, $R_2$, $R_3$, $R_4$, $R_5$ and $R_6$ is selected from the group consisting of a hydrogen atom and an aliphatic saturated hydrocarbon group expressed by the formula of $C_nH_{2n\pm 1}$; and at least one of $R_1$, $R_2$, $R_3$, $R_4$, $R_5$ and $R_6$ is the aliphatic saturated hydrocarbon group in which n is a number ranging from 1 to 22, comprising bringing carbon dioxide into association with the electrocatalyst to effect said reduction.

* * * * *